United States Patent

Fishman

[11] Patent Number: 6,122,082
[45] Date of Patent: Sep. 19, 2000

[54] METHOD AND SYSTEM FOR COMMUNICATION BETWEEN OPTICAL AND SONET LAYERS IN MIXED WDM/SONET NETWORKS

[76] Inventor: Ilya M. Fishman, 558 Cambridge Ave., Palo Alto, Calif. 94306

[21] Appl. No.: 09/009,056

[22] Filed: Jan. 20, 1998

[51] Int. Cl.[7] .............................. H04B 10/20; H04J 4/00; H04J 14/02
[52] U.S. Cl. .......................... 359/117; 359/119; 359/123; 359/124; 359/128
[58] Field of Search ................................... 359/123, 128, 359/110, 119, 139, 117; 370/907

[56] References Cited

U.S. PATENT DOCUMENTS

| | | | |
|---|---|---|---|
| 5,406,549 | 4/1995 | Kremer | 370/16.1 |
| 5,550,818 | 8/1996 | Brackett et al. | 370/60 |
| 5,870,212 | 2/1999 | Nathan et al. | 359/119 |
| 5,920,412 | 7/1999 | Chang | 359/128 |
| 5,978,113 | 11/1999 | Kight | 359/110 |
| 5,982,517 | 11/1999 | Fishman | 359/119 |

OTHER PUBLICATIONS

U.S. Patent Application S/N 08/867,346 "Method and System for Service Restoration in Optical fiber communication Networks", filed on Jun. 2, 1997 by Fishman, I.M.

U.S. Patent Application "System and Method for Protection of WDM/SONET Networks", filed on Dec. 4, 1997 by Fishman, I.M.

B. Kumar "Broadband Communications": a professional Guide to ATM, Frame Relay, SMDS, SONET and BISDN, McGraw–Hill, NY, 1995, pp. 164–181.

T.H.Wu "Fiber Network service Survivability" Norwood, MA, Artech House, 1992, pp. 38–53, and pp. 75–109.

*Primary Examiner*—Jason Chan
*Assistant Examiner*—Dalzid Singh
*Attorney, Agent, or Firm*—Bella Fishman

[57] ABSTRACT

In a mixed WDM/SONET network having optical and SONET layers, the communication between these layers is provided by optoelectronic units. The optical layer of the mixed network is presented by a WDM equipment and a service restoration system which utilizes optical switches and protects the mixed network from loss of the WDM traffic. The optoelectronic units monitor WDM and SONET traffic and control optical switches by utilizing a WDM/SONET adapter for communicating information between WDM and SONET equipment. The WDM/SONET adapter generates temporary SONET signals and passes these signals through the WDM and SONET equipment, and a service channel for transmitting control signals from the WDM/SONET adapter to the optical switches.

25 Claims, 6 Drawing Sheets

METHOD AND SYSTEM FOR COMMUNICATION BETWEEN OPTICAL AND SONET LAYERS IN MIXED WDM/SONET NETWORKS

BACKGROUND OF THE INVENTION

The present invention relates to the optical fiber telecommunication networks, comprising Synchronous Optical NETwork (SONET) rings or linear SONET systems, and multiple Wavelength Division Multiplexing (WDM) point-to-point links, and more particularly, to methods and system for communication between optical and SONET layers in mixed WDM/SONET networks.

WDM link capability to upgrade the network capacity without using additional fiber has brought about wide-scale deployment of WDM systems carrying many independent traffic channels over the same fiber. Deployment of WDM links shows that an optical layer having its own functions has emerged as a new independent layer in telecommunication networks. The optical layer requires independent service protection (restoration) in case of fiber or cable cuts. Methods of service protection for mixed WDM/SONET networks were suggested by the inventor of the subject patent application in the U.S. patent application Ser. No 08/867,346 "Method and System for Service Restoration in Optical Fiber Communication Networks" and the US Patent Application "System and Method for Protection of WDM/SONET Networks" filed Dec. 4, 1997. Optical switching technology was utilized to switch WDM traffic from a failed WDM link to a dedicated protection ring (DPR). The dedicated protection ring was selected from a plurality of SONET rings passing through the WDM link. Optical switches deployed at transmitting and receiving WDM terminals of DPR nodes rerouted WDM traffic from working fibers of WDM link to protection fibers of DPR.

Beyond adequate network architecture assuming the WDM traffic rerouting in case of cable cuts, a system and method had to be developed to detect possible failure, transfer the required information along DPR, control optical switch operation and report alarms. In currently deployed mixed WDM/SONET networks, communication between the network nodes is conducted independently on optical and SONET layers. WDM systems have their own service channels, usually one of out-of-band WDM channels dedicated for transport of device status and alarms. SONET terminals and add/drop multiplexers (ADMs) communicate with each other using SONET overhead. Overhead consists of several components such as section, line and path, each carrying certain functions [B. Kumar, Broadband Communications: a Professional Guide to ATM, Frame Relay, SMDS, SONET, and BISDN, McGraw-Hill, NY, 1995, pp. 164–181]. The overhead bytes responsible for Automatic Protection Switching (APS) are included in line overhead. Detailed description of APS functionality may be found, for example, in a book of T. H. Wu, "Fiber Network Service Survivability", Norwood, Mass., Artech House, 1992.

Optical switching technology has not been commercially deployed yet, and only experimental networks and testbeds were investigated. For demonstration of optical switching functionality, non-standard signaling protocols were used in these experimental networks and testbeds. However these non-standard protocols are not sufficient to detect failures in the optical domain, control optical switches and interact with SONET protocol. In present mixed WDM/SONET networks comprising WDM links and SONET rings, no interaction exists between SONET and optical layers. Introduction of optical switching technology into mixed network environment brought a necessity of communication between SONET and WDM control protocols. In principle, this communication may be introduced in Operation, Administration, Management and Provisioning (OAM&P) software. For WDM systems with many channels, OAM&P software upgrade becomes a global problem, because each SONET ring has to be managed separately. Also, time required for OAM&P response may exceed the maximum time interval tolerated by SONET standard for protection switching (about 50 msec). In the existing networks with SONET and WDM equipment, this software upgrade is difficult or impossible.

It is therefore desirable to develop a systematic approach to optical layer control for providing network survivability and compatibility with SONET protection mechanisms and other SONET functions through communication between optical and SONET layers.

SUMMARY OF THE INVENTION

In view of the foregoing, it is a general object of the present invention to provide a method and system for respective management of optical and SONET telecommunication layers. Preferably, this method and system is used for management and control of protection system in a mixed WDM/SONET network.

It is an advantage of the present invention that the SONET protocol is used for interaction between SONET and optical layers.

It is a further advantage of the present invention that switching priority on the optical layer is set dominant to other protection switching mechanisms.

It is a further advantage of the present invention that SONET protocol may be used for WDM failure signaling.

It is a further advantage of the present invention that the WDM equipment protection functionalities are implemented independently and complementary to SONET protection.

It is a further advantage of the present invention that all capabilities of SONET APS remain intact.

It is a further advantage of the present invention that the suggested control strategy allows to increase network reliability.

In the present invention, an optoelectronic unit is deployed at each mixed WDM/SONET network node comprising SONET and WDM equipment, to establish interaction between optical and SONET network layers. This unit executes interaction functions, and may be also used for local monitoring and control of nodes comprising SONET, WDM and optical switching equipment.

According to one aspect of the present invention, in a mixed WDM/SONET network, where an optical layer is presented by WDM equipment and a service restoration system using optical switches for protecting said network from loss of WDM traffic by rerouting it through a DPR ring with nodes equipped with WDM and SONET equipment, the interaction between optical and SONET layers is established by deployment of a plurality of optoelectronic units for monitoring WDM and SONET traffic and control of the optical switches at each node of the DPR. At least one optoelectronic unit comprises at least one local control loop (LCL) for each direction of the WDM traffic. The LCL being coupled by at least a pair of coupling devices to SONET and WDM equipment, provides communication between SONET and WDM equipment. The LCL comprises a WDM/SONET adapter formed by a generator of temporary SONET signals, a source of light and a switch connecting the generator and the source of light therebetween. Each optoelectronic unit comprises an optical switching circuit which receives the temporary SONET signals from a WDM/SONET adapter through a service channel and manipulates the optical switches. The generator of the WDM/SONET adapter provides temporary SONET signals comprising frames carrying the information coordinating performance of the WDM and SONET equipment. The temporary SONET signals may be synchronized to SONET signals of the DPR.

According to the other aspect of the present invention a system for control of optical switching equipment comprises a plurality of optoelectronic units for monitoring WDM and SONET traffic of the WDM and SONET equipment, wherein each such unit is deployed at each DPR node in the mixed WDM/SONET network. The DPR has at least one receiving WDM terminal for each direction of WDM traffic. The service restoration system is implemented into the DPR and comprises the rerouting and reconfiguration optical switches. The rerouting optical switch is connected to the receiving WDM terminal. At least one optoelectronic unit comprises a WDM/SONET adapter for providing communication between SONET and WDM equipment by sending commands and alarms over the mixed WDM/SONET network through a service channel and executing these commands by optical switching circuits for manipulating the rerouting and reconfiguration optical switches. The WDM/SONET adapter is coupled to the WDM/SONET equipment by at least three coupling devices, two of these coupling devices are deployed at opposite sides of the rerouting optical switch.

The optoelectronic units detect WDM failure, establish switching priorities between optical and SONET layers, and transmit the messages required for optical switch control, through SONET overhead or through WDM service channel. The WDM/SONET adapter is activated when the WDM traffic failure occurs, and turned off after the protection switching is completed. Also, this optoelectronic unit may be used for local monitoring and control of network nodes.

The present invention comprises further a method for communication between optical and SONET layers which is performed by utilizing the systems disclosed above. In a mixed WDM/SONET network having a plurality of SONET rings passing through a WDM link and retaining SONET automatic protection switching function, the communication between optical and SONET layers is provided by establishing switching priorities between optical and SONET communication layers and detecting the network failure. In case of WDM link failure, optical switches are activated for rerouting WDM traffic and reconfiguring the protection path. SONET APS is delayed by generating temporary SONET signals through the mixed WDM/SONET network for a predetermined time interval, or until the optical switching procedure is completed and therefore SONET APS is released, and the alarms are reported.

The foregoing and other objects, features and advantages of the present invention will become apparent from the following detailed description of the preferred embodiment taken together with the accompanying drawings.

DESCRIPTION OF THE PREFERRED EMBODIMENTS

Figure 1:
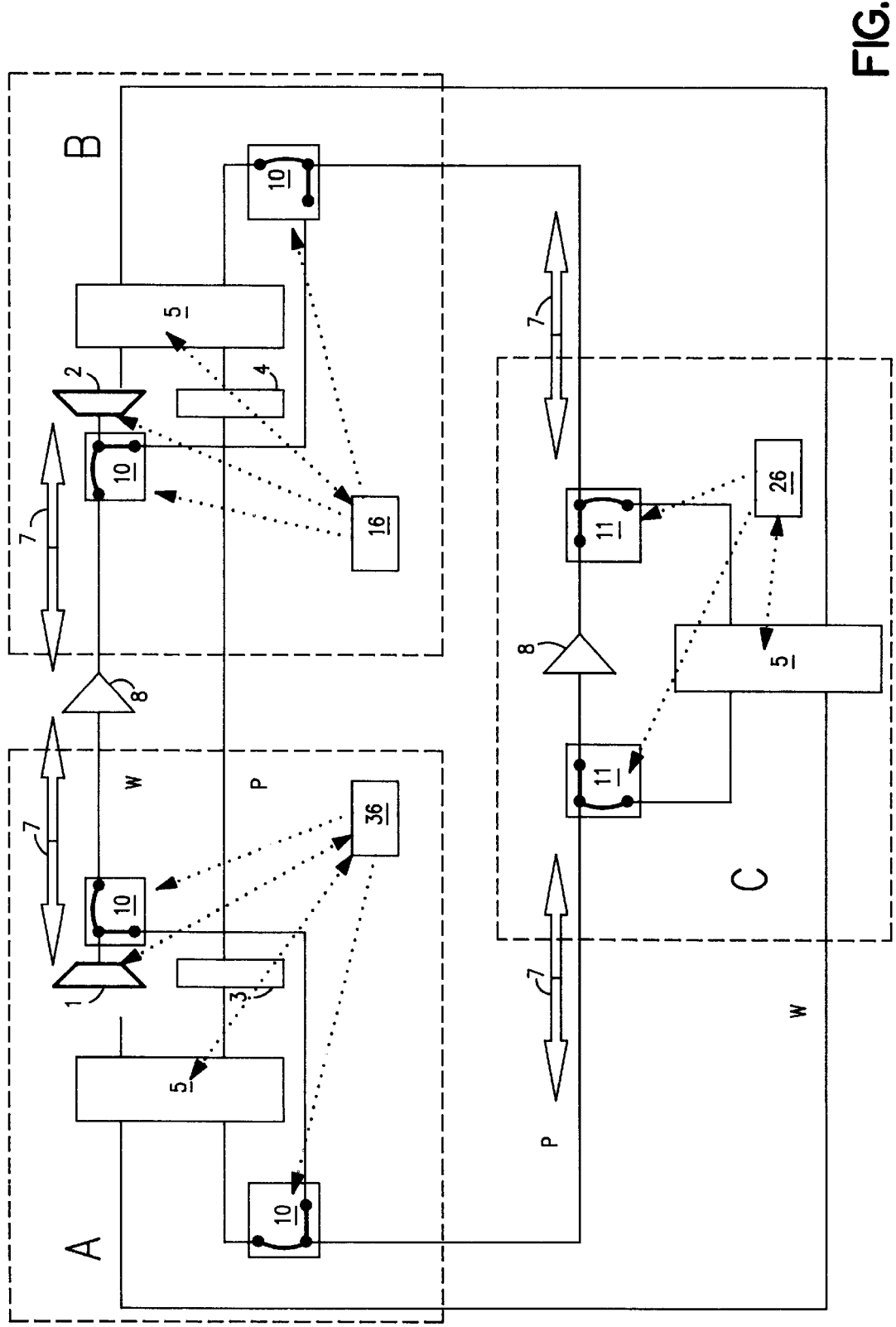
FIG. 1 is a schematic diagram of an optically protected WDM link with WDM failure detectors and optical switch control.

Architectures of mixed SONET/WDM networks utilizing DPR and optical switches for service restoration are described in detail in the US Patent Applications cited above and incorporated herein by reference. In mixed SONET/WDM networks, each SONET ring comprises at least three nodes that are interconnected by working and protection optical fibers. DPR comprising SONET and WDM equipment is selected for network protection in case of cable or fiber failure. DPR further comprises two types of optical switching equipment, for rerouting WDM traffic from the failed working optical fiber to the protection optical fiber, and for reconfiguration of the intermediate nodes within DPR for transmitting WDM traffic.

Mixed WDM/SONET networks comprise SONET rings, operating with digital information, and WDM systems which are, in essence, analog. Digital SONET rings and the analog WDM system operate as independent entities. To conduct optical layer procedures, such as wavelength add/drop, wavelength translation and protection switching, coordination and hierarchy should be established between SONET and optical layers.

For effective communication between optical and SONET layers, WDM and SONET traffic should be monitored, and deviations of the traffic parameters from their predetermined values should be detected. An extreme variation example is power loss resulting from fiber cut. Information related to one of the layers should be communicated to another layer, and the respective reaction of both layers should be controlled. In the present invention, the control function is performed by a control system with an adapter which is capable of translating the detected parameter variations on one layer into signals carrying commands for another layer.

The layer-to-layer interaction is particularly required if WDM and/or SONET traffic is interrupted, and protection mechanisms are activated. Service restoration for multiple WDM links in a mixed WDM/SONET network is provided in cases of fiber (cable) cuts and WDM equipment failures. When fiber or cable is cut in one of the WDM links, a protection system switches WDM traffic from failed working fiber to a protection fiber of a dedicated WDM/SONET ring. Depending on the choice of the optical switching technology and such parameters as switching speed and optical power loss, specific tasks assigned to the control system may be delaying SONET APS and monitoring switched WDM traffic. Hence the optical switches are inserted in the fiber plant, their parameters (reliability, low loss, polarization insensitivity etc.) are extremely important to minimize perturbation introduced by optical switching system. To avoid compatibility problems, optical switches should be preferably passive, with minimum optical power loss. For example, high speed Semiconducting Optical Amplifiers are difficult to integrate in the protection system, and only mechanical and thermo-optical switches are currently adequate candidates for the protection switching application. These switches, however, are relatively slow, their switching time is approximately 1 msec which is long compared to the SONET frame duration of 125 mksec. Furthermore, a switching time of 1 msec is comparable with signal propagation time along typical rings having lengths of several hundred kilometers. Delay related to signal propagation along DPR is always present and unrelated to optical switch speed. If no special measures are taken, SONET APS will be activated, and rings will switch. To prevent this undesirable event, the system of the present invention establishes switching priorities between WDM and SONET layers, and the highest priority is given to the optical layer. Namely, SONET APS is disabled for a certain period of time or before the WDM rerouting is completed. To implement this and other functions, a local control loop (LCL) is introduced in the mixed WDM/SONET network. The LCL function is to provide communication between SONET ADMs and WDM terminals, and to send switching commands and alarms over the network. LCL is activated when a failure in WDM link occurs. For communication between the nodes, SONET protocol or WDM service channel may be used. Commands which LCL may send through the network are command to delay SONET APS until optical restoration is completed or until it is found that the optical restoration can not be performed; command to prepare DPR for rerouted WDM traffic by activating rerouting and reconfiguration optical switches to reconfigure the DPR, and alarms.

To generate these and other commands, the LCL comprises a WDM/SONET adapter. This adapter is an optoelectronic device capable of communicating with SONET, WDM and optical switching equipment. The function performed by the adapter is to generate and transfer OC-N SONET frames carrying the required commands, through the network. When the WDM link failure occurs and the LCL is activated, the adapter sends Temporary SONET Frames (TSF) over the network. TSF is programmed to carry all required commands. Two major commands included in TSF are commands to reconfigure DPR for WDM traffic (this command may be sent through SONET overhead or through WDM service channel), and commands to temporarily turn off SONET APS, sent through SONET protocol.

Referring to FIG. 1, fiber and equipment connection with LCL is shown as an example in a 3-node DPR with nodes A, B and C, WDM link AB and protection path AC+CB. One working (W) and one protection (P) fibers are shown. LCL may be deployed in both 2- and 4-fiber rings. WDM terminals 1 and 2 are used to combine traffic from several working channels of SONET ADMs 5 from SONET rings between nodes A and B. Protection terminals 3 and 4 are used to provide protection capability between nodes A and B. Protection terminals 3 and 4 may be WDM terminals structured similar to WDM terminals 1 and 2, or other types of terminals providing connection between protection channels of SONET ADMs 5. Rerouting optical switches 10 are used to reroute WDM traffic from failed working fiber between nodes A and B to the protection DPR route AC+AB. At node C, reconfiguration optical switches 11 and optical amplifier 8 are deployed to carry WDM traffic along the protection route.

In currently deployed mixed WDM/SONET networks, management and control of SONET rings is provided by SONET protocol. For example, K-bytes of the line overhead are responsible for the APS function. Respectively, WDM systems have their own communication protocol which carries information on different parameters of individual channels and WDM traffic as a whole. Communication between WDM terminals and optical amplifiers is carried over service channel 7 (it may be one of WDM channels that is not loaded with working traffic).

In WDM/SONET networks without optical switches, there is no need for interaction between two different communication protocols. In the networks with optical switches (FIG. 1), this need becomes evident. When WDM traffic between nodes A and B of FIG. 1 fails, both optical and SONET protection functions will be activated. Optical switches 10 and 11, in response to WDM traffic loss along AB, will reroute WDM traffic to a protection path AC+CB. Practically simultaneously, all SONET rings (the number of these rings may be 32 and more) passing through AB link, will activate their protection functions, and all these rings will switch. Thus, the idea of the optical protection, which is intended to provide protection by optical means only, may be corrupted. Without communication between SONET and WDM protocols, protection capability can not be realized effectively. To provide coherent switching process, optoelectronic units 16, 26 and 36 are introduces in the network, capable of communicating with SONET, WDM and optical switching equipment. At node B with receiving WDM terminal 2, optoelectronic unit 16 is a LCL together with a switching control circuit for optical switches 10. Units 26 and 36 are switching control circuits for optical switches 11 (node C) and 10 (node A). LCL is also deployed at node A for an opposite direction of WDM traffic (not shown in FIG. 1).

Figure 2:
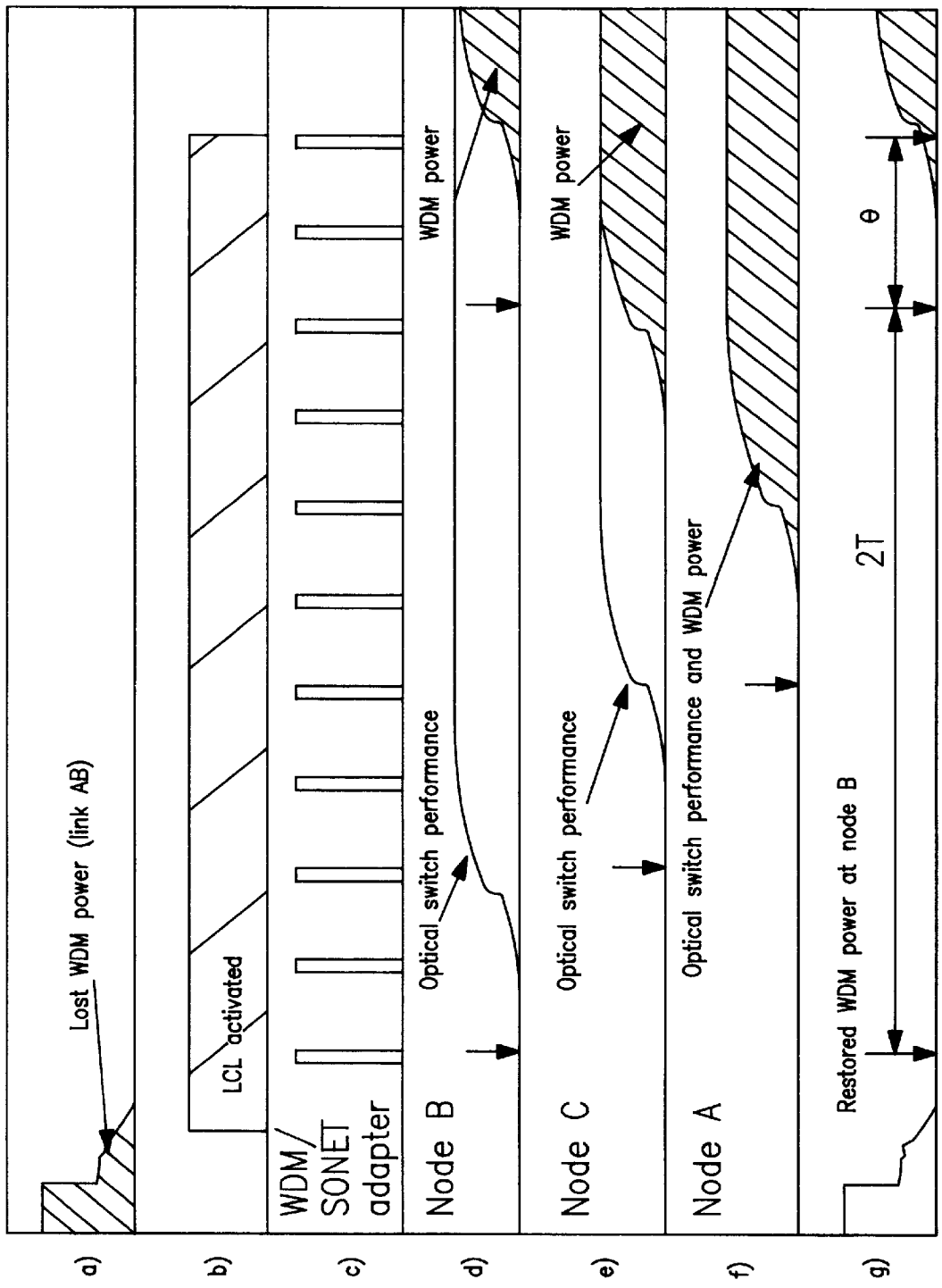
FIG. 2 is a timing diagram showing the sequence of events from losing WDM power to optical restoration.

Timing diagram of events following WDM traffic failure is shown in FIG. 2. After WDM traffic is lost (FIG. 2a), LCL detects loss of optical power and LCL is optically connected to the network (FIG. 2b). Temporary SONET frames (TSF) generated by LCL, are sent to SONET rings passing through the WDM link (FIG. 2c). Rerouting optical switch 10 at node B (FIG. 1) is activated (FIG. 2d). The message that WDM traffic is lost is transferred over DPR using TSF or WDM service channel, and received at node C (FIG. 2e) and at node A (FIG. 2f). Time T required for propagation of this message from node B to node A along several hundred kilometers DPR, is usually several milliseconds. After this message arrives at node A and optical switching is initiated, WDM traffic power builds up at node A (shadowed curve, FIG. 2f), and with propagation time delay—at node C (shadowed curve 2e) and at node B (shadowed curve 2d). After propagation through the protection path AC+CB, rerouted WDM traffic builds up at node B with a time delay 2T (FIG. 2g). Real delay between the failure and the moment when the LCL is turned off (FIG. 2b) exceeds 2T by the optical switching time $\Theta$ (FIG. 2g).

The choice to use SONET overhead or WDM service channel (for example, out-of-band 1310 nm channel) for communication between DPR nodes, depends primarily on economic consideration.

Figure 3:
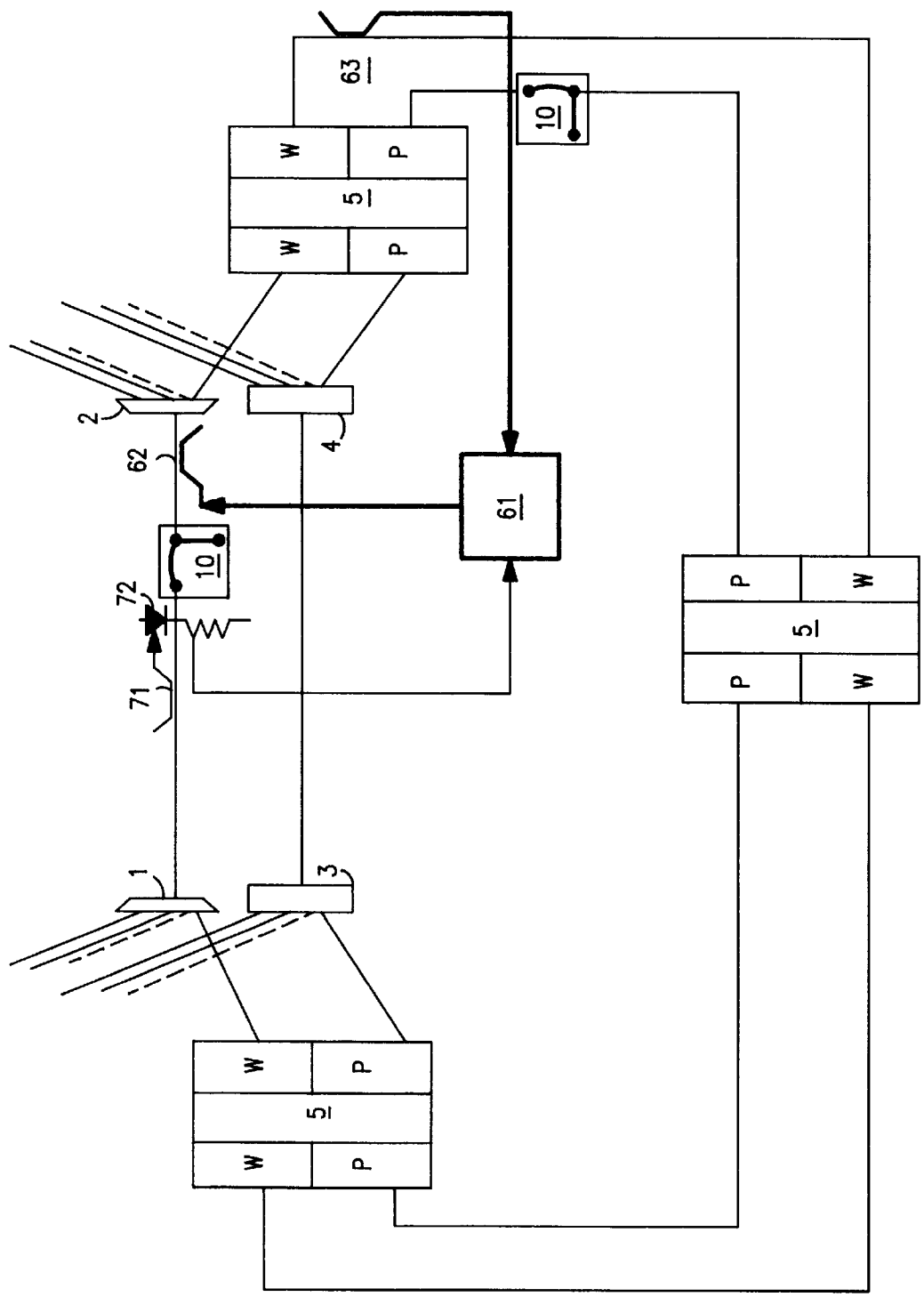
FIG. 3 is a schematic diagram of a Local Control Loop with a WDM/SONET adapter.
Figure 4:
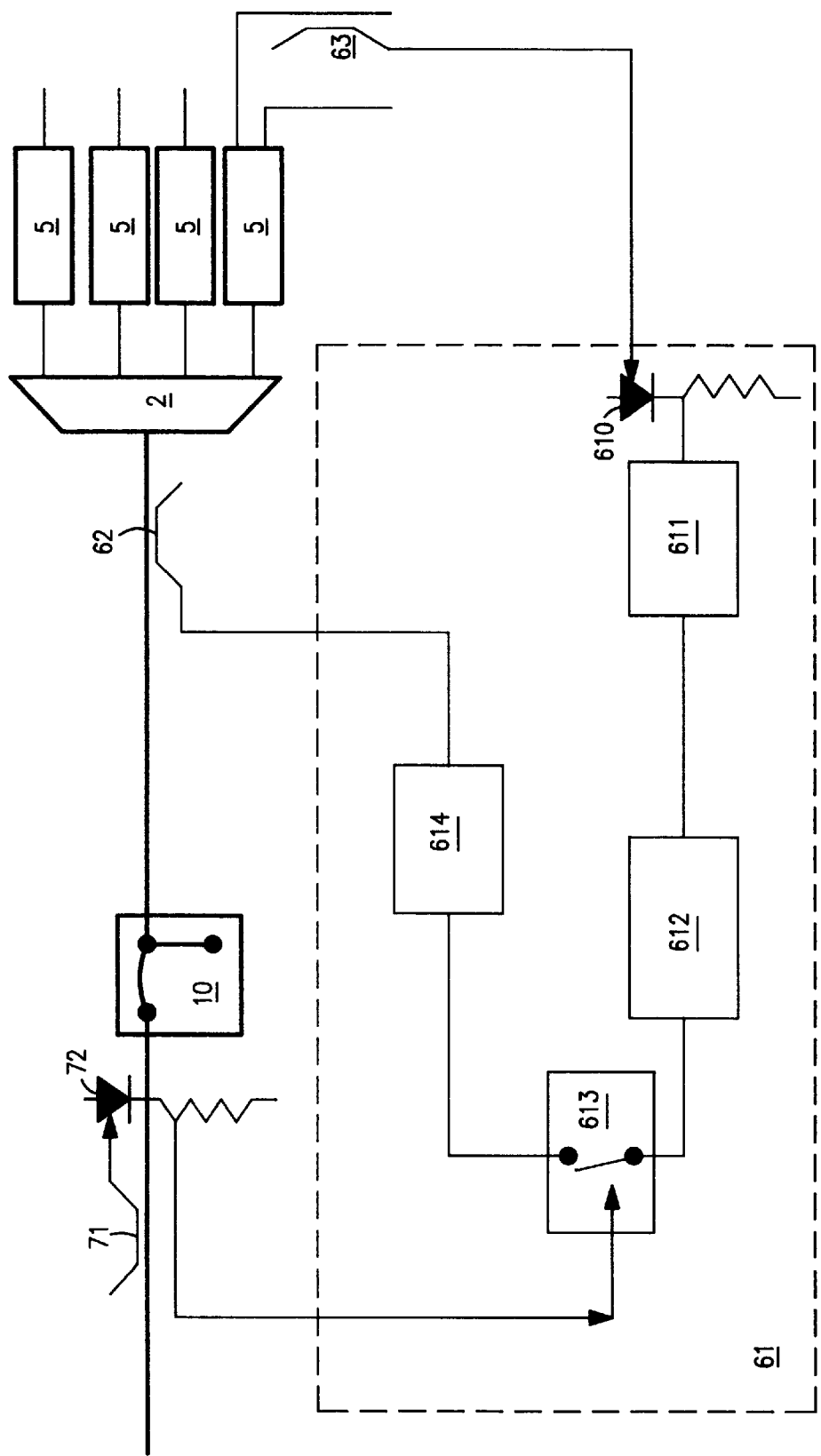
FIG. 4 is a schematic diagram of a synchronized WDM/SONET adapter for communication between WDM and SONET equipment.
Figure 5:
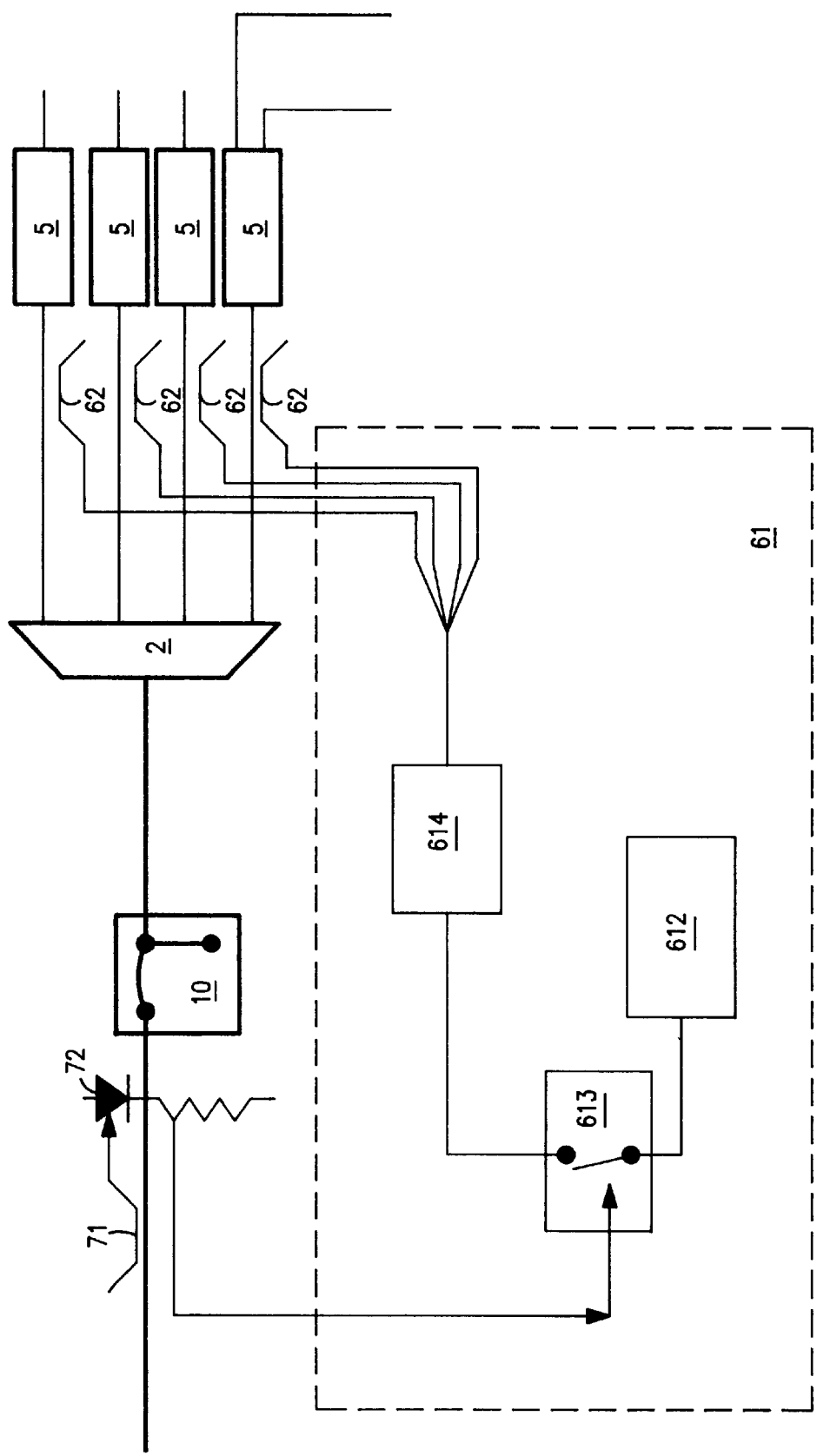
FIG. 5 is a schematic diagram of a free-running WDM/SONET adapter for communication between WDM and SONET equipment.

LCL coupling to the existing network, block diagram of WDM/SONET adapter and control circuitry of the optical switches are presented in FIGS. 3, 4 and 5, respectively. Referring to FIG. 3, LCL comprises WDM optical detectors and the WDM/SONET adapter. LCL is coupled to working DPR fibers using small fractions of optical power. Optical coupler 71 splits off a fraction of optical power to WDM optical detector 72. The output of the detector 72 is electrically connected to LCL WDM/SONET adapter 61. Functions performed by WDM/SONET adapter 61 include generating switching commands to rerouting switches 10 and reconfiguration switches 11 of FIG. 1; sending modified K1 and K2 bytes responsible for the APS function in the SONET protocol, through all SONET rings passing through WDM link to prevent APS; monitoring LCL and WDM signals and turning LCL off after WDM traffic is switched through the protection path.

In response to the signal from optical detector 72, WDM/SONET adapter 61 issues TSF and sends them through the mixed WDM/SONET network, to all SONET rings passing through WDM terminal 2 of FIG. 3. Depending on whether or not TSF is chosen to be synchronized with SONET frames circulated in DPR before WDM failure, additional coupler 63 may be used. In FIGS. 3 and 4, a synchronized WDM/SONET adapter is shown.

Optical couplers 71, 62 and 63 are chosen to introduce as little change in the network power budget as possible. For example, these couplers may be 95%:5%. Using relatively small power perturbations in the network, LCL receives inputs from the WDM system and communicates messages to all SONET rings.

The synchronized WDM/SONET adapter (FIG. 4) comprises clock recovery circuit 611 monitoring SONET signal phase in DPR through coupler 63 and detector 610; overhead generator 612; optical output modulator 613; light source (sources) 614; optical filters which are not shown in the diagram of FIG. 4 but may be installed between light source 614 and coupler 62. Optical and electrical connections of the synchronized WDM/SONET adapter in LCL are shown in FIG. 4. Overhead generator 612 permanently generates custom designed SONET frames. Detailed configuration of these frames depends upon service provider technical specifications and type of SONET equipment. In one of the preferred embodiments, APS command "lockout of protection" is included in the frame which prevents protection switching simultaneously in all SONET rings passing through the WDM link. This command in the K1 byte has a code 1111 and is normally externally initiated. In LCL, all frames generated by the WDM/SONET adapter include this command; however, before WDM traffic fails, switch 613 in FIG. 4 is turned off, and no signal from WDM/SONET adapter enters the network.

If optical switching commands are sent through SONET overhead, user channel bytes F1 from line overhead, growth bytes Z1, Z2 or E2 from line overhead or data communication bytes D may be used, depending on which bytes are available in the existing SONET equipment.

If the "lockout of protection" command is not supported by deployed SONET equipment, other sets of commands may be introduced in SONET frames generated by WDM/SONET adapter. For example, SONET overhead circulating in DPR may be copied to WDM/SONET adapter memory, and reproduced after the failure occurred; all rings passing through the WDM link will then receive temporarily the same SONET overhead. If an electronic output STS-N is available at SONET ATM 5, then coupler 63, optical detector 610 and clock recovery circuit 611 are not needed. Other modifications of SONET frames generated by the WDM/SONET adapter are possible and obvious for those skilled in the art. In case of failure, the WDM/SONET adapter temporarily becomes a source of SONET frames preventing activation of APS mechanisms.

In the embodiments of FIGS. 3 and 4, TSF generated by the WDM/SONET adapter, are synchronized with the SONET DPR traffic. which is required if, beyond the optical protection control, LCL provides other monitoring functions. If other monitoring functions are not performed, synchronization may not be needed. Then, the WDM/SONET adapter may be implemented as a free-running overhead generator, with or without reference to local clock source (FIG. 5).

In the LCL embodiment of FIGS. 3 and 4, only one light source is used to send TSF over all SONET rings. Light Emitting Diode (LED) with high enough power and wide emission spectrum, covering the spectrum of WDM signals may be used in this configuration. An alternative to this approach may be using one laser diode and n optical couplers between WDM demultiplexer 2 and SONET ADMs 5.

In FIG. 5, a WDM/SONET adapter modification is shown using a free-running frame generator and n optical couplers. WDM/SONET adapter comprises free-running overhead generator 612, optical output modulator 613, light source 614 and splitter 615. Overhead generator 612 permanently generates custom designed TSF. Detailed configuration of these frames depends upon service provider technical specifications and type of WDM and SONET equipment. For example, if maintaining average power in WDM link is essential, an arbitrary payload may be added to temporary SONET frames generated by overhead generator 612. This arbitrary payload may be produced by an appropriate generator of random numbers. These temporary SONET frames with random payload will be transmitted to all SONET rings passing through the WDM link.

In the networks comprising 2-fiber SONET rings, TSF is not sent through DPR, and coupler 62 is not installed in DPR.

Figure 6:
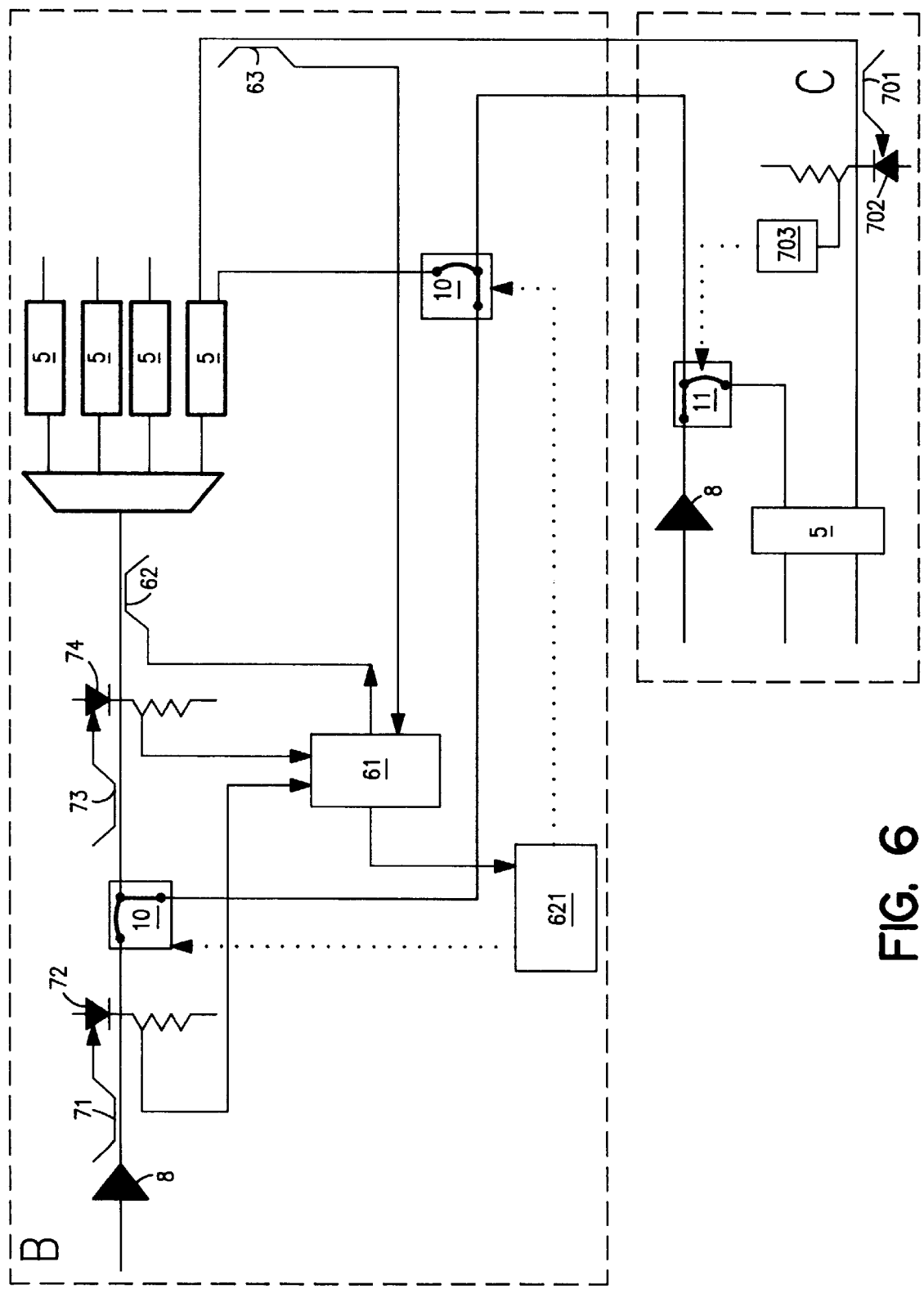
FIG. 6 is a diagram of protection switching units connections in two DPR nodes.

In FIG. 6, a full control circuit is shown for the two network nodes, WDM link node B and intermediate DPR node C. At node B, optical detectors 72 and 74 are coupled to WDM fiber through optical couplers 71 and 73. Signals from the detectors 72 and 74 control WDM/SONET adapter 61. To activate adapter 61, both detectors 72 and 74 should indicate WDM traffic loss. WDM /SONET adapter has two outputs: one of them transmits TSF through coupler 62, while another one turns on control circuits 621 of the optical switches 10.

To provide optical switching at other DPR nodes, control signals are sent through SONET overhead or through WDM service channel. In FIG. 6, these control commands are sent through SONET overhead. To get access to SONET frames, optical coupler 701, detector 702 and control circuit 703 are deployed at intermediate node C, to control reconfiguration optical switches 11 shown in FIG. 1. Similar equipment is deployed at node A, to control rerouting optical switches 10 at node A.

Normally, signal propagation time along DPR takes several milliseconds, and switching procedure at node C is delayed relative to node B. Switching of node A (FIG. 1) will be further delayed as shown in FIGS. 2d, 2e and 2f. After switching to protection route is completed at node A, it will take WDM traffic equal time delay to reach node B along the protection path AC+CB. After WDM traffic reaches node B along the protection path, the WDM/SONET adapter is turned off. When detector 72 shows zero WDM power, and at the same time detector 74 detects the presence of WDM power, the command is passing to the generator of the LCL to stop generating temporary SONET signals.

If the WDM traffic power increases gradually at the receiving node B because optical switches are slow (for example, 6 to 8 SONET frames will pass through optical switches before optical power reaches ~90% of its maximum), another method may be chosen to turn off the WDM/SONET adapter which should be, in this case synchronized to DPR SONET ADM. After the optical switching is completed, two signals propagate through DPR, one from LCL and another one from WDM traffic. Presence of two traffic streams at the input of the SONET ADM is used for turning the LCL off, for example, by Loss of Frame (LOF) command. The WDM/SONET adapter circuitry is turned off after two sequential LOF commands. The WDM/SONET adapter frame frequency is chosen half of the conventional frame frequency (frames are generated once for every 250 mksec, not 125 mksec).

If the optical protection switching was not successful (no power appeared at detector 74), LCL is turned off after a certain time interval depending on DPR length and time required for optical switching. After this time interval expires, the LCL is turned off, and conventional SONET APS function is restored.

If WDM channels have different bit rates (for example, several OC-48 and several OC-192), two or more WDM/SONET adapters will be used to delay APS in respective SONET rings.

With small modifications, the described method may be used for control of WDM equipment protection described in the cited above US patent applications. If one channel WDM equipment fails, LCL sends TSF along this channel and temporary blocks respective SONET ring from APS until the traffic is optically switched to a protection WDM channel. In this implementation, LCL should have access to individual SONET channels.

Though the method and system for communication between optical and SONET layers, and in particular, for control of the optical protection system, were developed for a mixed WDM/SONET network, they may be used with other network architectures, for example, for mesh or ATM networks. Other LCL applications and WDM/SONET adapter functions may be explored using SONET extra bits or a user channel. In any of these cases, TSF will be generated and sent over the WDM network or its part.

While there have been shown and described what are at present considered preferred embodiments of the present invention, it will be obvious to those skilled in the art that various changes and modifications may be made to the interlayer communication system and its implementation in the network architecture without departing from the scope of the invention as defined by the appended claims.

What is claimed is:

1. A system for communicating between optical and SONET layers in a mixed WDM/SONET network, where said optical layer comprises WDM equipment and a service restoration system using optical switches for optically protecting individual SONET channels and for protecting said network from loss of WDM traffic by rerouting WDM traffic through a dedicated protection ring, said dedicated protection ring comprising at least three nodes with WDM and SONET equipment, said communication system comprising:

a plurality of optoelectronic units for monitoring WDM and SONET traffic and control of said optical switches of said service restoration system, said optoelectronic units being deployed at each node of said dedicated protection ring;

at least one optoelectronic unit of said plurality comprising at least one local control loop for each direction of said WDM traffic, said local control loop comprising:

a WDM/SONET adapter for communicating information between said WDM and SONET equipment by generating temporary SONET signals and passing these signals through said WDM and SONET equipment;

at least a pair of coupling devices for coupling said WDM/SONET adapter with said node of said dedicated protection ring; and each said optoelectronic unit comprises an optical switching circuit for manipulating said optical switches, each said optical switching circuit being connected to said WDM/SONET adapter for receiving said temporary SONET signals.

2. The system for communicating between optical and SONET layers of claim 1, further comprising a service channel for transmitting local control loop signals to said optical switching circuits.

3. The system for communicating between optical and SONET layers of claim 2, wherein one of said coupling devices comprises an optical coupler and a transmitter for transmitting signals from WDM/SONET adapter to said WDM and SONET equipment, and another said coupling device comprises an optical coupler and a receiver for receiving signals from said WDM and SONET equipment.

4. The system for communicating between optical and SONET layers of claim 3, wherein said WDM/SONET adapter is an optoelectronic device comprising a generator of temporary SONET signals, a source of light and a switch connecting said generator with said source of light.

5. The system for communicating between optical and SONET layers of claim 4, wherein said temporary SONET signals comprises frames carrying information coordinating performance of said WDM and SONET equipment.

6. The system for communicating between optical and SONET layers of claim 5, wherein said temporary SONET signals of said WDM/SONET adapter are synchronized to SONET signals of said dedicated protection ring.

7. The system for communicating between optical and SONET layers of claim 5, wherein said light source has an optical spectrum which overlaps an optical spectrum of WDM traffic.

8. The system for communicating between optical and SONET layers of claim 5, wherein said local control loop further comprises a splitter and a plurality of optical couplers to said individual SONET channels for transmitting said temporary SONET signals from said light source to said SONET equipment.

9. A system for control of optical switching equipment with rerouting and reconfiguration optical switches being deployed at each node of a dedicated protection ring in a mixed WDM/SONET network having at least one receiving WDM terminal for each direction of WDM traffic, said receiving WDM terminal connected to said rerouting optical switch, comprising:

a plurality of optoelectronic units for monitoring WDM and SONET traffic of said WDM and SONET equipment and control of said rerouting and reconfiguration optical switches, each said optoelectronic unit being deployed at each node of said dedicated protection ring, at least one of said optoelectronic units comprising:

a local control loop with WDM/SONET adapter and coupling devices for communicating information between WDM and SONET equipment by generating temporary SONET signals and passing said signals through WDM and SONET equipment of said mixed WDM/SONET network; and a service channel for transmitting signals from said WDM/SONET adapter to said optical control units for manipulating said optical switches.

10. The system for control of optical switching equipment of claim 9, further comprising:

at least three coupling devices, two of said coupling devices being deployed at opposite sides of said rerouting optical switch; and each said optoelectronic unit comprising an optical switching circuit for manipulating said optical switches.

11. The system for control of optical switching equipment of claim 10, further comprising additional WDM/SONET adapters wherein each said adapter is provided for communication with SONET equipment having respective bit rate value.

12. The system for control of optical switching equipment of claim 11, wherein said temporary SONET signals have frame frequency equal or less than SONET standard frame frequency.

13. A method for communication between optical and SONET layers in mixed WDM/SONET networks with a plurality of SONET rings passing through WDM link and provided with SONET automatic protection switching function, the method comprising the steps of:

monitoring traffic in said optical and SONET layers;

detecting parameters of signals propagating in said optical and SONET layers;

detecting deviations of parameter values of said signals;

providing a WDM/SONET adapter between said optical and said SONET layers for generating command signals for said optical and SONET layers; and translating said deviations of said parameters detected at one of said optical and SONET layers to another said layer.

14. The method for communication between optical and SONET layers of claim 13, wherein the step of monitoring traffic comprises monitoring power in said WDM link.

15. The method for communication between optical and SONET layers of claim 14, wherein the step of detecting parameters comprises detecting of WDM power loss in said WDM link.

16. The method for communication between optical and SONET layers of claim 13, wherein in the step of generating command signals by said WDM/SONET adapter, said command signals are temporary SONET frames with predetermined overhead bytes.

17. The method for communication between optical and SONET layers of claim 16, further comprising a step of transmitting said temporary SONET frames to said plurality of SONET rings passing through said WDM link, said temporary SONET frames being designed so as to block said SONET automatic protection switching functions.

18. The method for communication between optical and SONET layers of claim 17, further comprising a step of blocking said SONET automatic protection switching functions for predetermined period of time by transmitting a SONET lockout of protection command for disabling said SONET automatic protection switching functions.

19. The method for communication between optical and SONET layers of claim 18, further comprising a step of filling of payload in said temporary SONET frames by a randomly generated signal.

20. The method for communication between optical and SONET layers of claim 19, further comprising a step of transmitting temporary SONET frames with random payload to said plurality of SONET rings passing through said WDM link.

21. The method for communication between optical and SONET layers of claim 20, further comprising a step of transmitting said temporary SONET frames to said plurality of SONET rings passing through said WDM link, said temporary SONET frames being designed so as to block said SONET automatic protection switching functions, said temporary SONET frames having random payload.

22. The method for communication between optical and SONET layers of claim 16, further comprising the steps of: providing optical switching circuits at each node of a dedicated protection ring for manipulating optical switches, manipulating said optical switches, sending said temporary SONET signals from said adapter to said optical switching circuits through a service channel, and monitoring the switched WDM power.

23. The method of claim 16 comprising detecting a failure of individual SONET channel, transmitting said temporary SONET signals to failed said individual SONET channel for blocking automatic protection switching function in said individual SONET channels.

24. The method for communication between optical and SONET layers of claim 17, further comprising a step of canceling said transmission of said temporary SONET frames by turning off the generator of said WDM/SONET adapter for restoring said SONET automatic protection switching functions.

25. The method for communication between optical and SONET layers of claim 20, further comprising a step of canceling said transmission of temporary SONET frames with random payload by turning off the generator of said WDM/SONET adapter for restoring said SONET automatic protection switching functions.

* * * * *